United States Patent Office 2,991,728
Patented July 11, 1961

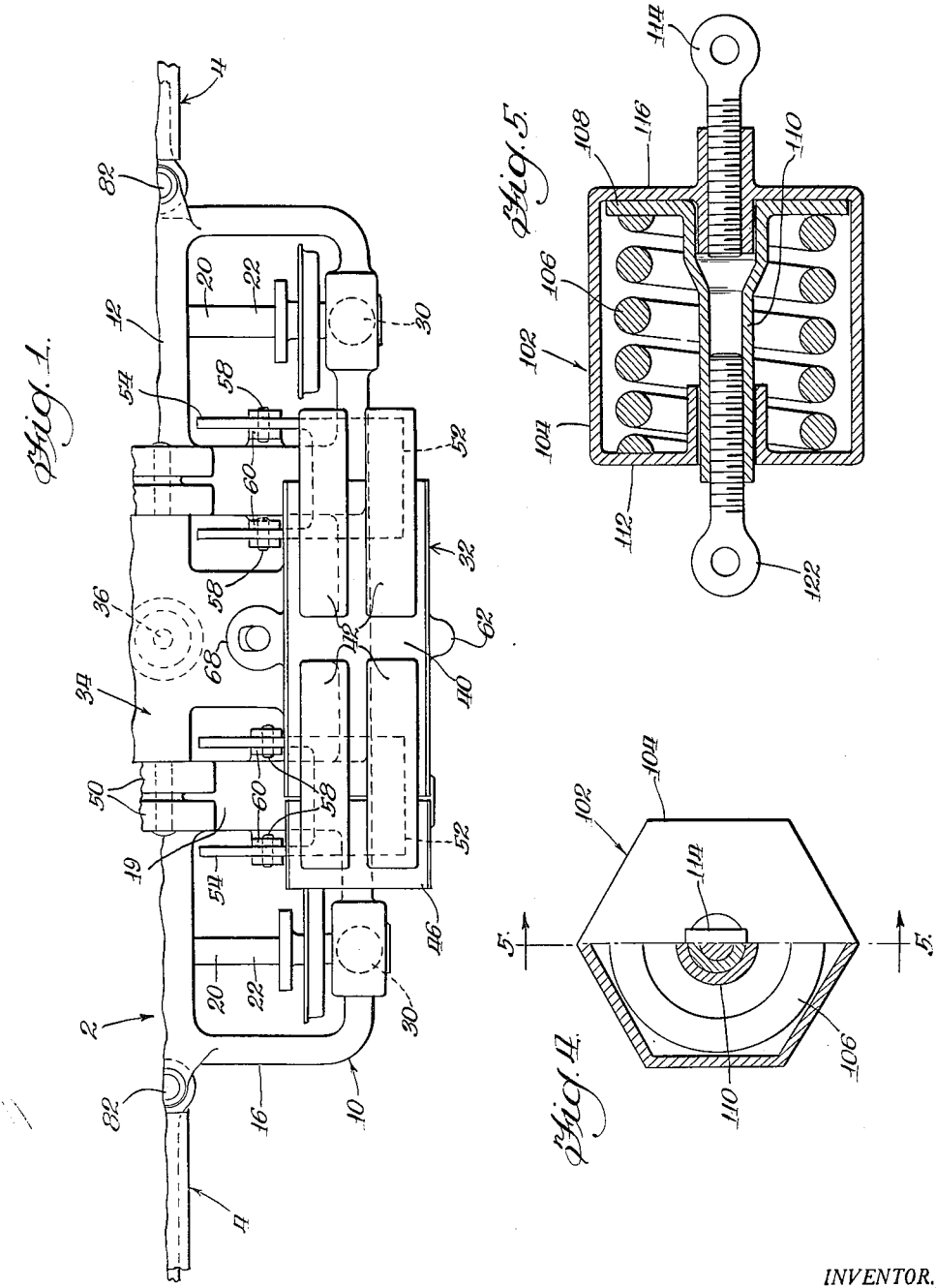

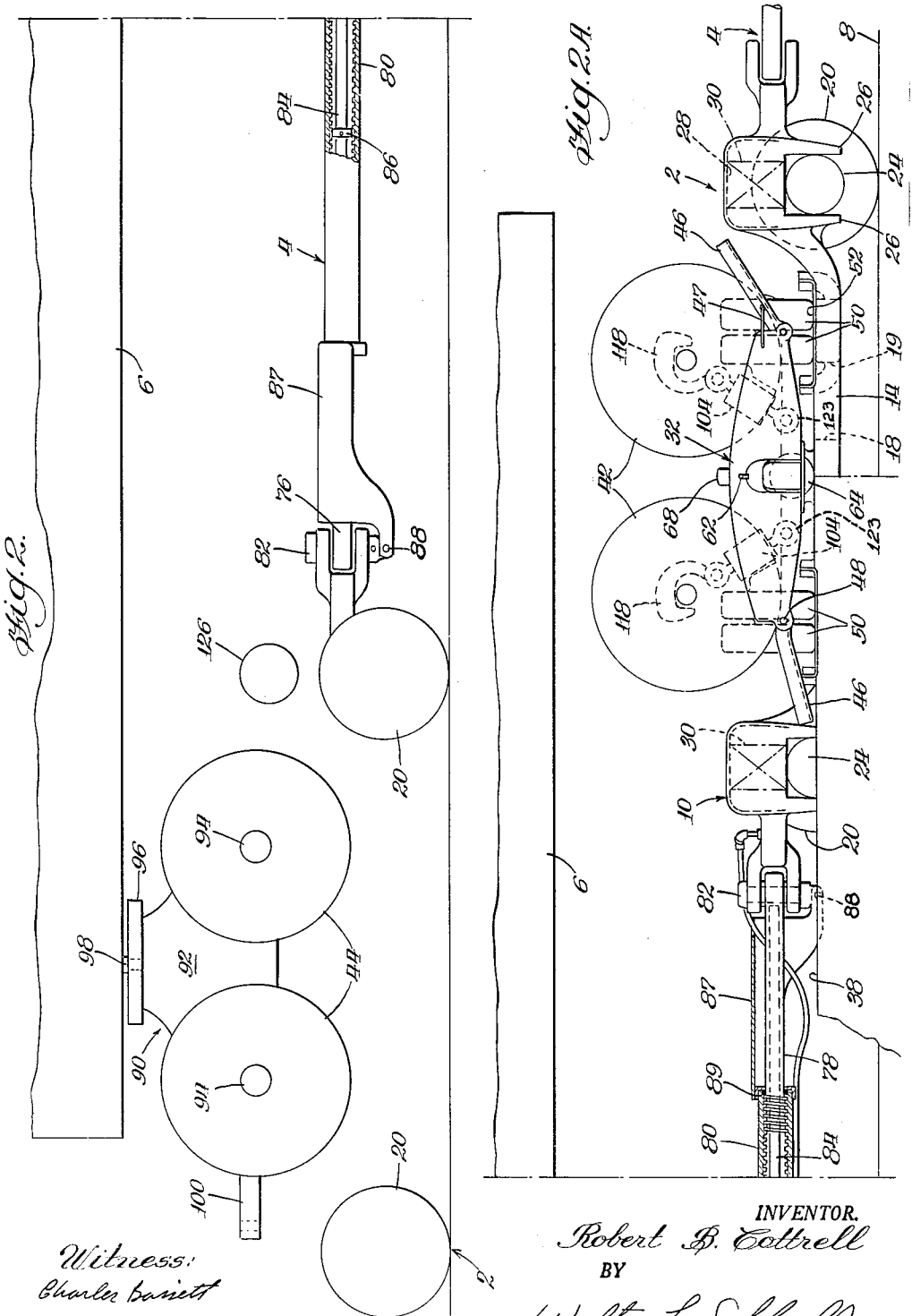

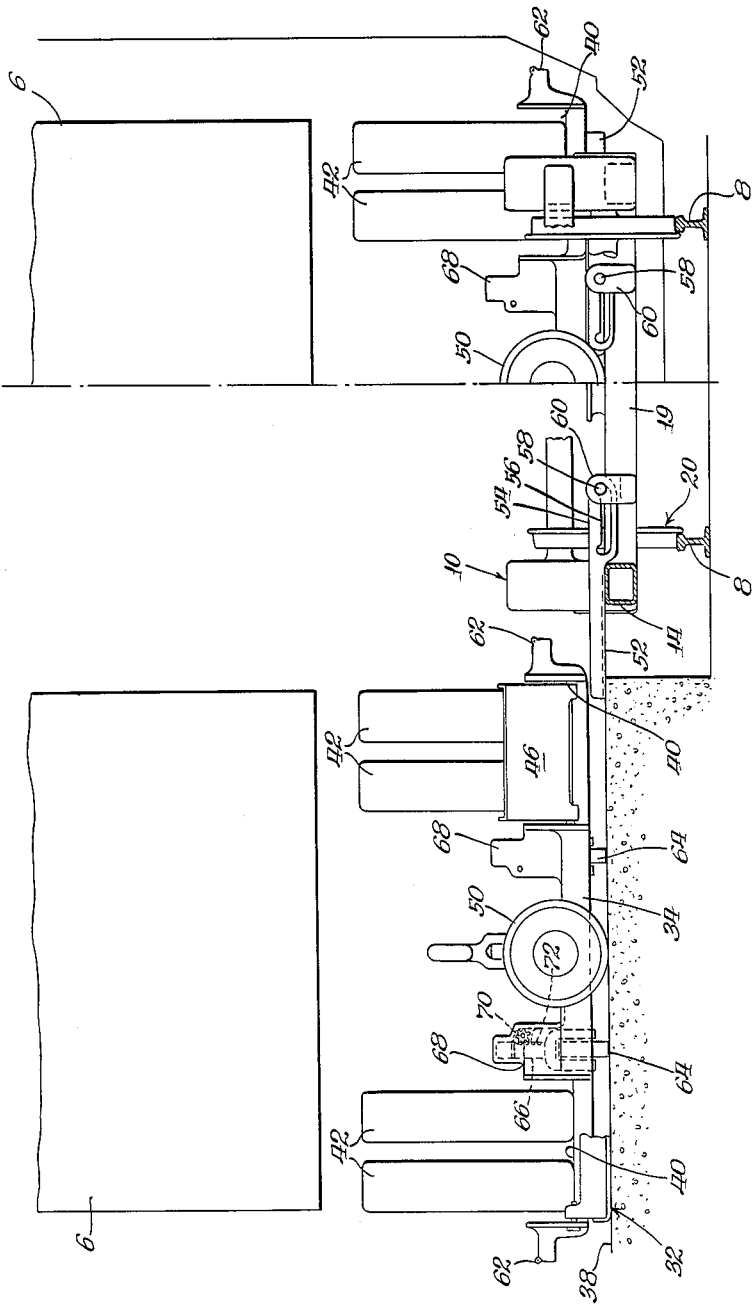

2,991,728
TRANSPORTING HIGHWAY TRUCKS ON RAILROAD TRACK
Robert B. Cottrell, Deerfield, Ill., assignor to American Steel Foundries, Chicago, Ill., a corporation of New Jersey
Filed Mar. 23, 1955, Ser. No. 496,220
21 Claims. (Cl. 105—159)

This invention relates to conveyances for transporting highway trailers on railway tracks.

It has heretofore been proposed that highway trailers could be transported from city to city on railway conveyances with a resultant saving in time and expense to shippers of merchandise. In order to effect such savings it is necessary to provide a railway conveyance on which loaded highway trailers may be quickly mounted for intercity movement and then quickly removed for movement by means of a highway tractor to their destination. As the present railway equipment is not economically suitable for use in the moving of highway trailers, it is an object of the present invention to provide a conveyance particularly designed and adapted for transporting highway trailers.

Another object of the invention resides in the provision of a railway conveyance comprising a plurality of identical four wheel railway trucks preferably interconnected by identical reach rods to form a train adapted to transport a plurality of highway trailers, with each trailer supported at its ends upon two adjacent trucks.

Another object of the invention resides in the provision of a railway conveyance comprising four wheel trucks having dollies thereon to engage and support the wheels of highway trailers, the dollies being slidable laterally of the trucks to facilitate movement of the trailers onto and off of the conveyance.

A further object of the invention resides in the provision of a conveyance in which each dolly may be journaled for rotational movement on its respective four wheel truck to permit the train to negotiate curved sections along the railway track.

Another object of the invention resides in the provision of a railway conveyance in which the reach rods are adjustable to vary the spacing between the four wheel trucks to accommodate trailers of different lengths.

Another object of the invention resides in the provision of a substitute set of wheels supporting the front end of each trailer and detachably interconnected thereto by means of a conventional fifth wheel, whereby each trailer may be quickly rolled onto, transported on, and then rolled off of a pair of adjacent dollies.

Another object of the invention resides in the provision of adjustable spring loaded tie bars for securing the trailer axles to the dollies to permit longitudinal flexibility between the trailer and the dollies during movement of the train.

The invention embodies other novel features, details of construction and arrangement of parts which are hereinafter set forth in the specification and claims and illustrated in the accompanying drawings, wherein:

FIGURE 1 is a top plan view illustrating a conveyance embodying features of the invention, only one-half of the conveyance being shown as it is symmetrical about its longitudinal center line;

FIGURES 2–2A are side elevational views illustrating a highway trailer supported upon two trucks interconnected by an adjustable reach rod, parts of the conveyance being shown in section;

FIGURE 3 is an end elevational view, partly in section, illustrating the manner in which the dolly is moved laterally from its truck onto a loading platform to facilitate movement of the highway trailer onto or off of the conveyance;

FIGURE 4 is an end elevational view, partly in section, illustrating the adjustable spring-loaded tie bar;

FIGURE 5 is a longitudinal sectional view taken along the line 5—5 of FIGURE 4.

Referring now to the drawings for a better understanding of the invention, the railway conveyance is shown as comprising a plurality of identical four wheel railway trucks 2, interconnected by adjustable reach rods 4 to form a train capable of transporting a plurality of highway trailers 6 along a railway track 8.

Each truck 2 is shown as comprising a one-piece frame 10 having a center rail 12 and side rails 14—14 interconnected by end rails 16—16 and transverse rails 18 and 19—19. Wheel and axle assemblies 20 are provided at opposite ends of the truck, the axles 22 being journaled at their ends in roller bearings 24 mounted for vertical reciprocative movement between pedestals 26—26 formed on the frame. Pockets 28 are formed in the frame 10 to house helical compression springs 30 engaging their respective roller bearings 24 to provide a resilient suspension system for the truck frame. To reduce the height of the loaded conveyance and to enhance the riding qualities thereof, the side, center and transverse rails preferably extend below the end rails in a plane spaced downwardly from a horizontal plane through the axes of the wheel and axle assemblies 20.

A dolly 32 is supported upon each truck 2 and is shown as comprising a body 34 rotatively mounted upon the truck frame by means of a center pin 36, the pin extending through the body and the transverse center rail 18 of the truck frame and being manually removable to permit lateral movement of the dolly relative to the frame during transfer of the trailer between the conveyance and a loading dock, indicated at 38 in FIGURE 3.

Trough-shaped wheel supporting platforms 40—40 are provided on opposite sides of the dolly body 34 to receive and support the rear wheels 42 or substitute supporting wheels 44 of the trailer. Each platform 40 is provided with dolly ramps 46—46 extending from opposite ends thereof and connected thereto by hinges at 48, each ramp being movable from a lower loading position against a loading dock to an upper position against the tread surface of its adjacent trailer wheel. The ramps 46 are adapted to be secured in fixed position against the wheels by means of tie rods 47 to serve as abutments to resist movement of the trailer longitudinally of the truck during movement of the train.

To facilitate transfer of the trailer between the loading platform or dock 38 and the conveyance, the dolly 32 is mounted for movement transversely of the truck 2 by means of four axially aligned wheels 50 journaled on the dolly for rolling engagement along the transverse rails 19—19 of the truck frame 10 and across truck ramps 52—52 onto the loading platform. Each truck ramp 52 is provided with spaced parallel arms 54—54 formed with slots 56—56 to receive pins 58—58 mounted on bosses 60—60 provided on opposite sides of the transverse frame rails 19—19, whereby the ramp is supported for sliding movement upon a side rail 14 between an inner inoperative position and an operative position in which the outboard end of the ramp rests upon the loading platform 38 to thus straddle the gap between the truck frame and the platform. After the center pin 36 is removed, the dolly 32 may be drawn onto or off of the truck frame 10 by a tractor or other source of power connected to one of the hitch brackets 62—62 provided on opposite sides of the dolly.

Axially aligned side bearing wheels 64—64 are provided on the dolly on opposite sides of the axis of the wheels 50 to prevent tilting of the dolly relative to the truck frame 10, each bearing wheel being journaled on the bifurcated lower end of a shaft 66 guided for vertical reciprocative movement within a housing 68 secured to the dolly body 34. Each bearing wheel 64 is adapted to be lowered into engagement against the transverse center rail 18 of the truck frame 10 by any suitable hydraulic or mechanical jack means to prevent tilting of the dolly. The jack means may, for example, comprise a manually rotatable pinion 70 journaled on the housing 68 for meshing engagement with a rack 72 provided in the shaft 66, the pinion being provided with a conventional pawl and ratchet locking mechanism (not shown), whereby the pinion and shaft may be locked in selected positions. It will be noted that the projected axes of the wheels 50 and 64 are radially disposed about the center pin 36 and angularly spaced 90° apart to support the dolly for rotational movement relative to the truck frame 10 when the train is moving along a curved track section.

As illustrated in FIGURES 2-2A each trailer 6 is supported at its ends upon two adjacent trucks 2 interconnected by means of an adjustable reach rod 4. The reach rod 4 is shown in the form of a turnbuckle comprising two tubular rods 76 and 78, one rod being formed with right hand threads for threaded engagement into one end of a sleeve 80, and the other rod having a left hand thread for threaded engagement into the other end of the sleeve. Each of the rods 76 and 78 is connected for limited universal movement relative to its respective truck frame 10 by means of a coupler pin 82.

To minimize bending stresses in the threads of the reach rod, a shaft 84 is secured at 86 to the sleeve 80 and has its ends snugly telescopically engaged within the rods 76 and 78. By rotating the sleeve 80, the length of the reach rod and the distance between adjacent trucks may be varied to accommodate trailers of different lengths. To prevent accidental rotation of the sleeve 80, locking clips 87 are slidably and nonrotatively mounted on opposite ends of the sleeve and pivotally connected at 88 to the lower ends of their respective coupler pins 82. Suitable seals 89 are provided at opposite ends of the sleeve 80 to prevent the escape of lubricant therefrom or the entrance of dirt thereinto.

A substitute supporting carriage 90 is provided to support the front end of each trailer during transport, loading and unloading of the latter, the carriage being shown as comprising a body 92 supported upon four wheels 44 journaled on axles 94 and having a conventional fifth wheel 96 for detachable engagement with a king pin 98 on the trailer. The carriage is provided with a tow bar 100 adapted to be detachably connected to a tractor by means of a coupler pin.

Longitudinal flexibility between the trailers and their related dollies 32 is obtained by means of adjustable, spring-loaded tie bar devices 102 (FIGURE 5). Each tie bar device is shown as comprising a hexagonal housing 104 enclosing a helical compression spring 106 interposed between a flange 108 on a tubular shank 110 and one end wall 112 of the housing. An eye screw 114 is threaded into the other end wall 116 of the housing and has a hook 118 (FIGURE 2A) mounted thereon for engagement with one of the trailer axles. The tubular shank 110 is internally threaded to receive an eye screw 122 pivotally connected to the dolly body 34 by means of an eye bolt 123. The screw 114 is formed with a right hand thread and the screw 122 is formed with a left hand thread, whereby the housing 104 may be rotated to vary the length of the tie bar device.

To transport a highway trailer 6 on the conveyance, two interconnected trucks 2 are arranged alongside a loading platform 38. After removal of the center pins 36, raising of the side bearing wheels 64 and positioning of the truck ramps 52, as shown in FIGURE 3, the dollies are drawn onto the platform by means of platform trucks connected to the hitches 62. After the side bearing wheels and the dolly ramps 46 have been lowered, a trailer supported at its front end upon a substitute supporting carriage 90 is moved onto the dollies to dispose the wheels 42 and 44 on the dolly platforms 40. The dolly ramps 46 are then secured in their raised positions by tie rods 47, and the side bearing wheels 64 are raised to permit platform trucks to move the dollies back onto their respective trucks. The center pin 36 is then replaced, the side bearing wheels 64 are lowered, and the spring loaded tie bar devices 102 are secured to the trailer axles.

To unload the trailer from the trucks, the center pins 36 are removed, the side bearing wheels 64 are raised, the truck ramps 52 are moved outboardly to engage the platform 38, and the dollies are drawn across the truck ramps onto the platform by means of platform trucks connected to the hitches 62. The tie bar devices 102 are then disconnected from the trailer axles, and the dolly ramps 46 and side bearing wheels are lowered to engage the platform. The trailer is then drawn from the dollies by a platform truck connected to the draw bar 100.

While the front end of the trailer is supported upon its conventional landing gear 126, the substitute supporting carriage 90 may readily be mounted thereon or removed therefrom for engagement by a conventional highway tractor.

I claim:
1. In a conveyance for transporting on railway tracks a vehicle having wheels at the ends thereof; the combination of: two interconnected railway trucks, wheeled dollies mounted on said trucks to support the wheels at respective ends of said vehicle, and pivot means interconnecting related dollies and trucks for relative rotational movement when the trucks are moving along curved track sections.

2. In a conveyance for transporting highway trailers on railway tracks, two articulatedly interconnected railway trucks, dollies mounted on said trucks to support opposite ends of a trailer, detachable pivot means interconnecting related dollies and trucks for relative rotational movement when the conveyance is moving along curved track sections, each dolly being mounted on support wheels for movement transversely of its associated truck onto a loading platform after detachment of said pivot means.

3. In a conveyance for transporting highway trailers on railway tracks, two interconnected trucks, dollies mounted on said trucks to support opposite ends of a trailer, detachable pivot means interconnecting related dollies and trucks for relative rotational movement when the conveyance is moving along curved track sections, each dolly being mounted on support wheels for movement transversely of its associated truck onto a loading platform after detachment of said pivot means, side bearing wheels provided on opposite sides of each dolly to prevent tilting of the dolly relative to its supporting truck.

4. In a conveyance for transporting highway trailers on railway tracks, two interconnected trucks, dollies mounted on said trucks to support opposite ends of a trailer, detachable pivot means interconnecting related dollies and trucks for relative rotational movement when the conveyance is moving along curved track sections, each dolly being mounted on support wheels for movement transversely of its associated truck onto a loading platform after detachment of said pivot means, side bearing wheels provided on opposite sides of each dolly to prevent tilting of the dolly relative to its supporting truck, means to move said side bearing wheels out of engagement with the trucks during movement of the dollies between the trucks and the loading platform.

5. A conveyance according to claim 1, in which an adjustable reach rod is pivotally connected at its ends to said trucks.

6. In a railway conveyance for transporting highway trailers, spaced railway trucks, a reach rod interconnecting said trucks for universal although limited relative movement, and means mounted on each truck to support one end of a highway trailer for rotation about a vertical axis, said means comprising wheeled dollies affording movement of said trailer transversely of said trucks onto a loading platform to facilitate mounting and removal of trailers.

7. In a railway conveyance for transporting highway trailers, spaced railway trucks, a reach rod interconnecting said trucks, and means on each truck to rotatably support one end of a wheeled highway trailer, said means including inclined surfaces engaging and at least partially confining opposite ends of the trailer wheels, and adjustable spring-loaded tie bar devices providing longitudinal flexibility between the trailers and the trucks.

8. In a railway conveyance, a railway truck comprising wheel and axle assemblies, a frame resiliently supported on said assemblies, truck ramps connected to and extending transversely of said truck and movable outboardly thereof to bridge a gap between the truck frame and a loading platform, a load supporting dolly mounted on said truck for movement transversely thereof and across said truck ramps onto a loading platform, said dolly having supporting surfaces for movement of wheels of a supported load thereonto in longitudinal direction, and detachable means to rotatively connect said dolly to said frame.

9. In a railway conveyance, a railway truck comprising wheel and axle assemblies, a frame resiliently supported on said assemblies, truck ramps connected to and extending transversely of said truck and movable outboardly thereof to bridge a gap between the truck frame and a loading platform, a load supporting dolly mounted on said truck for movement transversely thereof and across said truck ramps onto a loading platform, detachable means rotatively connecting said dolly to said frame, said frame comprising side rails having their medial portions arranged in a horizontal plane below the axes of the wheel and axle assemblies.

10. In a railway conveyance, a railway truck comprising wheel and axle assemblies, a frame resiliently supported on said assemblies, truck ramps connected to and extending transversely of said truck and movable outboardly thereof to bridge a gap between the truck frame and a loading platform, a load supporting dolly mounted on said truck for movement transversely thereof and across said truck ramps onto a loading platform, detachable means rotatively connecting said dolly to said frame, said frame comprising side rails having their medial portions arranged in a horizontal plane below the axes of the wheel and axle assemblies, said side rails being resiliently supported on the outboard ends of said wheel and axle assemblies.

11. In a conveyance for transporting highway trailers on railway tracks, two articulatedly interconnected railway trucks, wheeled dollies mounted on said trucks for supporting the ground engaging wheels at opposite ends of a trailer, said dollies having mutually and longitudinally aligned surfaces for moving the trailer onto and off of the dollies in longitudinal direction and at least one of the dollies and trailer having interengaging surfaces restraining movement therebetween about vertical axes, said dollies being capable of being wheeled onto and off of the railway trucks, and pivot means interconnecting related dollies and trucks for relative rotational movement about vertical axes when the conveyance is moving along curved track sections.

12. In a railway conveyance for transporting highway trailers, spaced railway trucks, a reach rod interconnecting said trucks, means removably mounted on each truck to support the ground engaging wheels on one end of a highway trailer for rotation of that end of the trailer about a vertical axis, and readily detachable pivot means interconnecting the related means and truck to permit limited rotational movement of the means relative to the truck.

13. In a railway conveyance for transporting highway trailers, spaced railway trucks, a reach rod interconnecting said trucks, and means removably mounted on each truck to support the ground engaging wheels on one end of a highway trailer for rotation of that end of the trailer about a vertical axis, said means comprising a dolly disposed between the related wheels and truck, said dolly being pivotally movable relative to its respective truck, said reach rod being adjustable to vary the spacing between said trucks to accommodate trailers of different lengths.

14. In a railway conveyance for transporting highway trailers, spaced railway trucks, a reach rod interconnecting said trucks, and means removably mounted on each truck for supporting one end of a highway trailer for rotation about a vertical axis, said means comprising dollies pivotally mounted to the trucks, and wheel supporting platforms on opposite sides of said dollies.

15. In a railway conveyance for transporting highway trailers, spaced railway trucks, a reach rod interconnecting said trucks, and means removably mounted on each truck for supporting one end of a highway trailer for rotation about a vertical axis, said means comprising dollies detachably secured to the trucks, wheel supporting platforms on opposite sides of each of said dollies, and dolly ramps pivotally connected to opposite ends of each wheel platform.

16. In a railway conveyance for transporting highway trailers, spaced railway trucks, a reach rod interconnecting said trucks, and means removably mounted on each truck for supporting one end of a highway trailer for rotation about a vertical axis, said means comprising dollies detachably secured to the trucks, wheel supporting platforms on opposite sides of each of said dollies, and dolly ramps pivotally connected to opposite ends of each wheel platform, said ramps being disposed to engage trailer wheels mounted on the wheel platforms during transport of trailers.

17. In a railway conveyance for transporting highway trailers, spaced railway trucks, a reach rod interconnecting said trucks, and means removably mounted on each truck for supporting one end of a highway trailer for rotation about a vertical axis, said means comprising dollies detachably secured to the trucks, wheel supporting platforms on opposite ends of each of said dollies, and adjustable spring-loaded tie bar devices provided on said dollies for engagement with a trailer mounted thereon to provide longitudinal flexibility between the trucks and trailers.

18. In a railway conveyance, a railway truck comprising wheel and axle assemblies, a frame resiliently supported on said assemblies, truck ramps connected to and extending transversely of said truck and movable outboardly thereof to bridge a gap between the truck frame and a loading platform, a load supporting dolly pivotally mounted on said truck, said dolly being movable transversely thereof and across said truck ramp onto said loading platform, said dolly having supporting surfaces for movement of wheels of a supported load thereonto in a longitudinal direction, and inclined surfaces pivotally connected to said supporting surfaces to partially confine the ends of the wheels of said supporting load.

19. In a railway conveyance for transporting highway trailers, spaced railway trucks, a reach rod interconnecting said trucks, means mounted on each truck to support the ground engaging wheels on one end of a highway trailer for rotation of that end of the trailer about a vertical axis, and pivot means interconnecting the related means and truck to permit limited rotational movement of the means relative to the truck.

20. In a railway conveyance for transporting highway trailers, spaced railway trucks, a reach rod interconnecting said trucks, and means mounted on each truck to support the ground engaging wheels on one end of a highway trailer for rotation of that end of the trailer about a vertical axis, said means comprising a dolly disposed between the related wheels and truck, said dolly being pivotally movable relative to its respective truck, said reach rod being adjustable to vary the spacing between said trucks to accommodate trailers of different lengths.

21. In a railway conveyance for transporting highway trailers, spaced railway trucks, a reach rod interconnecting said trucks, and means mounted on each truck for supporting one end of a highway trailer for rotation about a vertical axis, said means comprising dollies pivotally mounted to the trucks, and wheel supporting platforms on opposite sides of said dollies.

References Cited in the file of this patent
UNITED STATES PATENTS

| | | |
|---|---|---|
| 1,581,745 | Kellett | Apr. 20, 1926 |
| 1,994,815 | Ferrin | Mar. 19, 1935 |
| 2,121,181 | Bayerl | June 21, 1938 |
| 2,709,969 | Andert | June 7, 1955 |